(12) United States Patent
Baek et al.

(10) Patent No.: US 12,054,593 B2
(45) Date of Patent: Aug. 6, 2024

(54) ANTI-REFLECTIVE FILM HAVING MONOLAYER ARRANGEMENT OF INORGANIC HOLLOW PARTICLES, POLARIZING PLATE COMPRISING SAME, AND OPTICAL DISPLAY DEVICE COMPRISING SAME

(71) Applicant: Samsung SDI Co., Ltd., Yongin-si (KR)

(72) Inventors: Il Woong Baek, Suwon-si (KR); Seo Young Kang, Suwon-si (KR); Yoo Jin Kim, Suwon-si (KR); Han Su Kim, Suwon-si (KR); Dong Yoon Shin, Suwon-si (KR); Yeon Ju Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 878 days.

(21) Appl. No.: 16/967,465

(22) PCT Filed: Dec. 13, 2018

(86) PCT No.: PCT/KR2018/015858
§ 371 (c)(1),
(2) Date: Aug. 5, 2020

(87) PCT Pub. No.: WO2019/156330
PCT Pub. Date: Aug. 15, 2019

(65) Prior Publication Data
US 2021/0223438 A1 Jul. 22, 2021

(30) Foreign Application Priority Data
Feb. 12, 2018 (KR) .................. 10-2018-0017302

(51) Int. Cl.
*C08J 7/043* (2020.01)
*C08J 7/046* (2020.01)
(Continued)

(52) U.S. Cl.
CPC .............. *C08J 7/043* (2020.01); *C08J 7/046* (2020.01); *G02B 1/11* (2013.01); *G02B 1/115* (2013.01); *G02B 1/14* (2015.01)

(58) Field of Classification Search
CPC ....... G02B 1/113–118; G02B 1/11–118; G02F 1/133502; G02F 2201/38
See application file for complete search history.

(56) References Cited

U.S. PATENT DOCUMENTS

| | | | |
|---|---|---|---|
| 7,692,747 B2* | 4/2010 | Itadani | G02F 1/134363 349/117 |
| 2004/0240070 A1* | 12/2004 | Suzuki | G02B 1/111 359/599 |

(Continued)

FOREIGN PATENT DOCUMENTS

| CN | 102086316 A | 6/2011 |
|---|---|---|
| CN | 107635765 A | 1/2018 |

(Continued)

OTHER PUBLICATIONS

China Office Action from corresponding Chinese Patent Application No. 201880089040.4, Chinese Office Action mailed Jun. 22, 2021 (7 pgs.).

(Continued)

*Primary Examiner* — Ryan S Dunning
(74) *Attorney, Agent, or Firm* — Lewis Roca Rothgerber Christie LLP

(57) ABSTRACT

Provided are an anti-reflective film, a polarizing plate comprising same, and an optical display device comprising same, wherein in the anti-reflective film, a base layer, a (Continued)

high-refractive layer, and a low-refractive layer are sequentially stacked, the low-refractive layer comprising inorganic hollow particles having an average particle diameter of about 70 nm to about 150 nm, the low-refractive layer comprising a single layer arrangement of the inorganic hollow particles.

14 Claims, 1 Drawing Sheet

(51) Int. Cl.
*G02B 1/11* (2015.01)
*G02B 1/115* (2015.01)
*G02B 1/14* (2015.01)

(56) References Cited

U.S. PATENT DOCUMENTS

| | | | |
|---|---|---|---|
| 2012/0200933 A1 | 8/2012 | Akiyama et al. | |
| 2016/0178806 A1* | 6/2016 | Takei | C03C 8/16 359/507 |
| 2017/0123108 A1* | 5/2017 | Kobori | G02B 1/113 |

FOREIGN PATENT DOCUMENTS

| | | |
|---|---|---|
| JP | 2005-215461 A | 8/2005 |
| JP | 2011-122005 A | 6/2011 |
| JP | 2016-189102 A | 11/2016 |
| KR | 10-2006-0051423 A | 5/2006 |
| KR | 10-2012-0002863 A | 1/2012 |
| KR | 10-2015-0050063 A | 5/2015 |
| KR | 10-2016-0140208 A | 12/2016 |
| KR | 10-2017-0052343 A | 5/2017 |
| WO | WO-2016003175 A1 * 1/2016 ............. G02B 1/111 |

OTHER PUBLICATIONS

Chinese Office action dated Dec. 15, 2021 issued in corresponding CN Application No. 201880089040.4, 9 pages.
Korean Office action in corresponding Korean Application No. 10-2018-0017302, Korean Office action issued Aug. 6, 2020 (6 pgs.).

* cited by examiner

[FIG. 1]
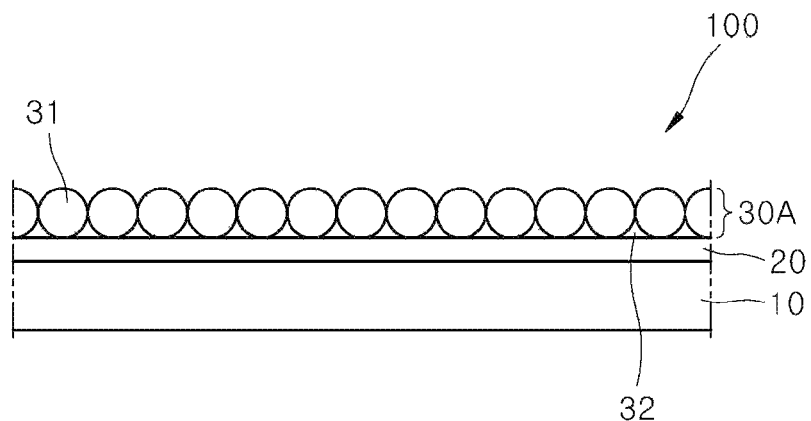
[FIG. 2]
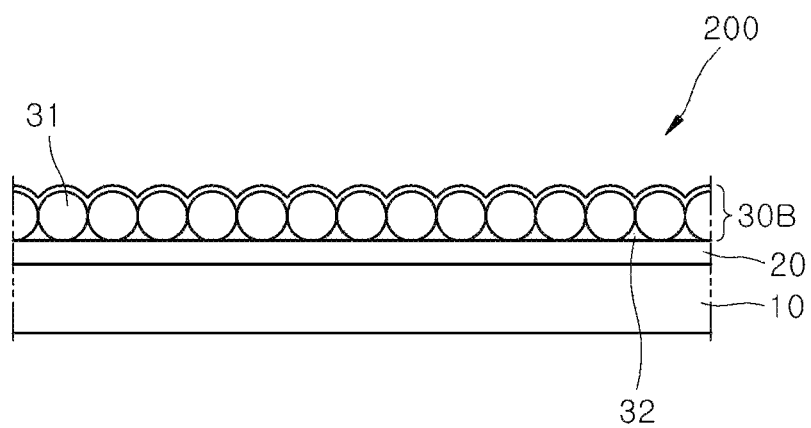
[FIG. 3]
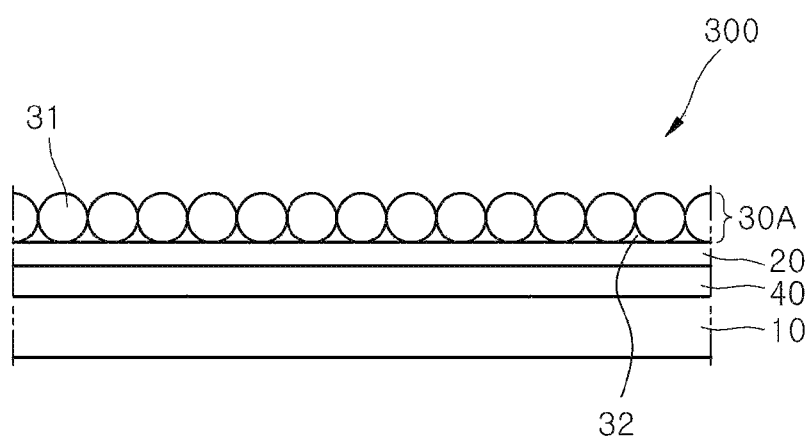

ANTI-REFLECTIVE FILM HAVING MONOLAYER ARRANGEMENT OF INORGANIC HOLLOW PARTICLES, POLARIZING PLATE COMPRISING SAME, AND OPTICAL DISPLAY DEVICE COMPRISING SAME

CROSS-REFERENCE TO RELATED APPLICATIONS

This application is a U.S. National Phase Patent Application of International Application Number PCT/KR2018/015858, filed on Dec. 13, 2018, which claims priority to Korean Patent Application Number 10-2018-0017302, filed on Feb. 12, 2018, the entire contents of both of which are incorporated herein by reference.

TECHNICAL FIELD

The present invention relates to an anti-reflective film, a polarizing plate including the same, and an optical display device including the same.

BACKGROUND ART

In operation of an optical display device, there is a problem that a screen cannot be properly viewed due to reflection of outdoor light or indoor light for illumination on the screen. In order to overcome such a problem, an anti-reflective film capable of suppressing reflection is formed on the outermost surface of the optical display device. Lower reflectivity provides better image quality in operation of the screen by suppressing reflection on the screen.

In general, the anti-reflective film is formed by sequentially stacking a high refractivity layer and a low refractivity layer on a base layer. In order to increase strength of the anti-reflective film, a hard coating layer may be formed between the base layer and the high refractivity layer. Since the low refractivity layer is disposed at the outermost side of the anti-reflective film, reflectivity of the anti-reflective film mainly depends on the low refractivity layer.

The low refractivity layer has a bilayer structure of hollow silica having a particle diameter of about 50 nm. However, the anti-reflective film including such a low refractivity layer is vulnerable to water and can suffer from deterioration in blocking of external light due to increase in reflectivity when exposed to high temperature and humidity conditions or high humidity conditions for a long period of time.

The background technique of the present invention is disclosed in Korean Patent Application No. 2005-0087312 and the like.

DISCLOSURE

Technical Problem

It is one aspect of the present invention to provide an anti-reflective film capable of preventing or minimizing increase in reflectivity even when left under high temperature and humidity conditions or under high humidity conditions for a long period of time.

It is another aspect of the present invention to provide an anti-reflective film that does not suffer from variation in degree of polarization and transmittance as compared with a conventional anti-reflective film formed by depositing hollow particles in a bilayer structure.

Technical Solution

In accordance with an aspect of the present invention, an anti-reflective film includes: a base layer, a high refractivity layer, and a low refractivity layer sequentially stacked, wherein the low refractivity layer includes a monolayer arrangement of inorganic hollow particles having an average particle diameter of about 70 nm to about 150 nm and arranged in a single layer.

In one embodiment, the single layer may have a thickness of about X nm to about X nm+3 nm when the average particle diameter of the inorganic hollow particles is about X nm.

In one embodiment, the inorganic hollow particles may include hollow silica.

In one embodiment, the low refractivity layer may have a thickness in the range of about 100% to about 120% of the average particle diameter of the inorganic hollow particles.

In one embodiment, the inorganic hollow particles may be present in an amount of about 20% by weight (wt %) to about 70 wt % in the low refractivity layer.

In one embodiment, the inorganic hollow particles may be continuously arranged without a gap therebetween.

In one embodiment, the inorganic hollow particles may form an outermost surface of the anti-reflective film.

In one embodiment, the monolayer arrangement of the inorganic hollow particles may directly adjoin the high refractivity layer.

In one embodiment, the anti-reflective film may further include a hard coating layer between the base layer and the high refractivity layer.

In one embodiment, the anti-reflective film may have a reflectivity variation rate of about 100% or less, as calculated by Equation 1:

Reflectivity variation rate=$|R_1-R_0|/R_0 \times 100$,  <Equation 1>

Wherein Equation 1, $R_0$ indicates initial reflectivity (unit: %) of the anti-reflective film and $R_1$ indicates reflectivity (unit: %) of the anti-reflective film left at 60° C. and 95% relative humidity (RH) for 72 hours.

In one embodiment, $R_1$ may be about 0.7% or less in Equation 1.

In accordance with another aspect of the present invention, a polarizing plate may include: a polarizer; and the anti-reflective film according to the present invention formed on one surface of the polarizer.

In one embodiment, the polarizing plate may have a reflectivity variation rate of about 100% or less, as calculated by Equation 2:

Reflectivity variation rate=$|R_3-R_2|/R_2 \times 100$,  <Equation 2> wherein Equation 2, $R_2$ indicates initial reflectivity (unit: %) of the polarizing plate and $R_3$ indicates reflectivity (unit: %) of the polarizing plate left at 60° C. and 95% RH for 72 hours.

In one embodiment, the polarizer may further include a polarizer protective layer formed on a light incident surface of the polarizer.

In accordance with a further aspect of the present invention, an optical display device includes the polarizing plate according to the present invention.

Advantageous Effects

The present invention provides an anti-reflective film capable of preventing or minimizing increase in reflectivity even when left under high temperature and humidity conditions or under high humidity conditions for a long period of time.

The present invention provides an anti-reflective film that does not suffer from variation in degree of polarization and transmittance as compared with a conventional anti-reflective film formed by depositing hollow particles in a bilayer structure.

BRIEF DESCRIPTION OF DRAWINGS

FIG. 1 is a sectional view of an anti-reflective film according to one embodiment of the present invention.
FIG. 2 is a sectional view of an anti-reflective film according to another embodiment of the present invention.
FIG. 3 is a sectional view of an anti-reflective film according to a further embodiment of the present invention.

BEST MODE

Hereinafter, embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, "(meth)acryl" means acryl and/or methacryl.

Herein, "average particle diameter" means a diameter of inorganic hollow particles at which a passage mass percentage corresponds to 50 wt % in a cumulative curve of mass of the inorganic hollow particles depending on particle diameter thereof. The particle diameter of the inorganic hollow particles may be measured by a particle diameter analyzer (Nanotrac Wave, Microtrac Co., Ltd.) but is not limited thereto.

Herein, "in-plane retardation (Re)" is represented by Equation 3:

$$Re = (nx - ny) \times d, \quad \text{<Equation 3>}$$

wherein Equation 3, nx and ny are indexes of refraction of a base layer in the x-axis and y-axis directions thereof and d is the thickness (unit: nm) of the base layer.

Based on the findings that, with a structure including a base layer, a high refractivity layer formed on the base layer, and a low refractivity layer formed on the high refractivity layer, wherein the low refractivity layer includes a monolayer arrangement of inorganic hollow particles having an average particle diameter of about 70 nm to about 150 nm and arranged in a single layer, an anti-reflective film can have good effects in reliability and blocking external light by preventing or minimizing increase in reflectivity even when left under high temperature and humidity conditions or under high humidity conditions for a long period of time, and does not suffer from variation in degree of polarization and transmittance, as compared with an anti-reflective film formed by depositing hollow particles in a bilayer structure, the inventors completed the present invention.

Hereinafter, an anti-reflective film according to one embodiment of the present invention will be described with reference to FIG. 1.

Referring to FIG. 1, an anti-reflective film 100 may include a base layer 10, a high refractivity layer 20 formed on the base layer 10, and a low refractivity layer 30A formed on the high refractivity layer 20. The low refractivity layer includes a monolayer arrangement of inorganic hollow particles having an average particle diameter of about 70 nm to about 150 nm and arranged in a single layer. With the monolayer arrangement of the inorganic hollow particles having the average particle diameter, the anti-reflective film can maintain reflectivity, as compared with an anti-reflective film including a low refractivity layer having a bilayer arrangement, and can prevent or minimize increase in reflectivity even when left under high temperature and humidity conditions or under high humidity conditions by preventing moisture retention affecting reflectivity, thereby improving reliability and an external light blocking effect. Here, the term "monolayer arrangement" may include a structure wherein the inorganic hollow particles are arranged in a single layer. In some embodiments, the single layer, that is, the inorganic hollow particle layer, has a maximum thickness of about X nm to about X nm+3 nm when the average particle diameter of the inorganic hollow particles is about X nm.

In one embodiment, the anti-reflective film may have a reflectivity of about 0.5% or less, for example, about 0.2% to about 0.5%. Within this range, the anti-reflective film can secure improvement in screen quality. For example, the anti-reflective film may have a reflectivity of about 0.2%, 0.3%, 0.4%, or 0.5%.

In one embodiment, the anti-reflective film may have a reflectivity variation rate of about 100% or less, for example, about 75% or less, for example, about 70% or less, as calculated by Equation 1:

$$\text{Reflectivity variation rate} = |R_1 - R_0|/R_0 \times 100, \quad \text{<Equation 1>}$$

wherein Equation 1, $R_0$ indicates initial reflectivity (unit: %) of the anti-reflective film and $R_1$ indicates reflectivity (unit: %) of the anti-reflective film left at 60° C. and 95% relative humidity (RH) for 72 hours.

Within this range, the anti-reflective film can suppress increase in reflectivity even under high temperature and humidity conditions or under high humidity conditions.

In Equation 1, $R_1$ may be about 0.7% or less, for example, about 0.2% to about 0.7%, specifically 0.2% to 0.6%. Within this range, the anti-reflective film can secure improvement in screen quality.

The anti-reflective film may have a thickness of about 10 μm to about 150 μm, specifically about 30 μm to about 120 μm, more specifically about 40 μm to about 100 μm. Within this range, the anti-reflective film can be applied to optical display devices.

The base layer 10 serves to support the anti-reflective film while improving mechanical strength of the anti-reflective film.

The base layer may have an index of refraction of about 1.40 to about 1.80, for example, about 1.45 to about 1.70, specifically about 1.48 to about 1.60. Within this range, the base layer can reduce reflectivity of the anti-reflective film when the high refractivity layer and the low refractivity layer are sequentially stacked thereon.

The base layer may have a moisture permeability of about 10 g/m²·day or more, for example, about 10 g/m²·day to about 50 g/m²·day. According to the present invention, even in the structure wherein the anti-reflective film includes the base layer having moisture permeability, the inorganic hollow particles are arranged in the monolayer arrangement and fundamentally prevent moisture, which affects reflectivity, from remaining between the inorganic hollow particles, thereby improving reliability and an external light blocking effect by preventing or minimizing increase in reflectivity even under high temperature and humidity conditions or under high humidity conditions. Here, moisture permeability may mean, for example, a value measured under conditions of 40° C. and 90% RH in accordance with KS A1013, without being limited thereto.

The base layer may have a light transmittance of about 80% or more, specifically about 85% to about 95%, in the visible spectrum. Within this range, the base layer can be used in a polarizing plate. The base layer may include a film formed of an optically clear resin. Specifically, the resin may include at least one selected from among cellulose resins including triacetylcellulose (TAC) and the like, polyester resins including polyethylene terephthalate, polyethylene naphthalate, polybutylene terephthalate, polybutylene naphthalate, and the like, polycarbonate resins, poly(meth)acrylate resins including poly(methyl methacrylate) and the like, polystyrene resins, polyamide resins, and polyimide resins. Preferably, the resin may be a cellulose ester resin including triacetylcellulose (TAC) and the like, or a polyester resin including polyethylene terephthalate and the like.

Although the base layer may be a non-stretched film, the base layer may be may be a retardation film or an isotropic optical film having a predetermined range of retardation and formed by stretching the resin by a certain method. In one embodiment, the base layer may have an in-plane retardation Re of about 8,000 nm or more, specifically about 10,000 nm or more, more specifically greater than about 10,000 nm, still more specifically about 10,100 nm to about 15,000 nm. Within this range, the base resin can prevent rainbow spots from being visible and can further improve an effect of diffusing light diffused through a contrast enhancing layer. In other embodiments, the base layer may be an isotropic optical film having an in-plane retardation Re of about 60 nm or less, specifically about 0 nm to about 60 nm, more specifically about 40 nm to about 60 nm. Within this range, the base resin can improve image quality through compensation for viewing angle. Herein, the term "isotropic optical film" means a film having substantially the same nx, ny and nz, and the expression "substantially the same" includes not only the case where nx, ny and nz are completely the same, but also the case where there is an acceptable tolerance.

The base layer may have a thickness of about 10 μm to about 150 μm, specifically about 30 μm to about 120 μm, more specifically about 40 μm to about 100 μm. Within this range, the base layer can be used in the anti-reflective film.

The high refractivity layer 20 is formed on the base layer to improve hardness of the anti-reflective film while reducing reflectivity of the anti-reflective film together with the low refractivity layer. The high refractivity layer may be a single layer or may be constituted by two or more layers having different indexes of refraction.

The high refractivity layer has a higher index of refraction than the low refractivity layer. The high refractivity layer may have an index of refraction in the range of about 1.53 to about 1.70, for example, about 1.56 to about 1.65. Within this range, a stack of the high refractivity layer and the low refractivity layer can reduce reflectivity of the anti-reflective film.

The high refractivity layer may have a thickness of about 30 nm to about 200 nm, specifically about 50 nm to about 150 nm, more specifically about 70 nm to about 120 nm. Within this range, the high refractivity layer can be used for the anti-reflective film and can secure hardness thereof.

The high refractivity layer may be formed of a composition for the high refractivity layer, which can provide an index of refraction of about 1.53 to about 1.70 after curing. The composition for the high refractivity layer may have an index of refraction of about 1.53 to about 1.70, for example, about 1.55 to about 1.65.

In one embodiment, the composition for the high refractivity layer may include a high refractivity composition, a UV curable compound having a lower index of refraction than the high refractivity composition, an initiator, and inorganic particles.

The high refractivity composition is a UV curable compound and may include at least one of fluorene, biphenyl, bisphenol, thiophenyl, thiobenzyl, phenyl sulfide and thionaphthalene-based high refractivity resins and high refractivity monomers. Preferably, the high refractivity composition includes at least one selected from among a fluorene-based compound and a biphenyl-based compound in order to reduce reflectivity of the anti-reflective film by improving the index of refraction of the high refractivity layer.

The UV curable compound has a lower index of refraction than the high refractivity composition. However, the UV curable compound forms a matrix of the high refractivity layer while improving hardness of the high refractivity layer. A composition including the high refractivity composition alone reduces hardness of the antireflection film and thus cannot be used in an optical display device. The UV curable compound is preferably a compound having a UV curable group, for example, a (meth)acrylate group or an epoxy group. The UV curable compound may include at least one selected from among bi- or higher functional (meth)acrylate monomers, oligomers formed therefrom, and resins formed therefrom. For example, the UV curable compound may be a bi- to deca-functional (meth)acrylate compound.

The UV curable compound may include at least one selected from among a polyfunctional (meth)acrylate, such as an ester of polyhydric alcohol and (meth)acrylic acid, and a polyfunctional urethane (meth)acrylate obtained from a hydroxyl ester of polyhydric alcohol, an isocyanate compound and (meth)acryl acid. The UV curable compound may include a bi- or higher functional (meth)acrylate compound. The bifunctional (meth)acrylate compound may include, for example, di(meth)acrylates, such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, hydroxypivalic acid neopentyl glycol di(meth)acrylate, and the like. A tri- or higher functional (meth)acrylate compound may include, for example, tri (meth)acrylates, such as trimethylol propane tri(meth)acrylate, ethoxylated trimethylol propane tri(meth)acrylate, propoxylated trimethylol propane tri(meth)acrylate, tris-hydroxy ethyl isocyanurate tri(meth)acrylate, glycerin tri (meth)acrylate, and the like, trifunctional (meth)acrylate compounds, such as pentaerythritol tri(meth)acrylate, dipentaerythritol tri(meth)acrylate, ditrimethylol propane tri (meth)acrylate, and the like, tri- or higher functional (meth) acrylate compounds, such as pentaerythritol tetra(meth) acrylate, ditrimethylol propane tetra(meth)acrylate, dipentaerythritol tetra(meth)acrylate, dipentaerythritol penta (meth)acrylate, ditrimethylol propane penta(meth)acrylate, dipentaerythritol hexa(meth)acrylate, ditrimethylol propane hexa(meth)acrylate, and the like, and polyfunctional (meth) acrylate compounds obtained through substitution of part of these (meth)acrylates with an alkyl group or ε-caprolactone.

The initiator may cure the high refractivity composition and the UV curable compound to form the high refractivity layer. The initiator may include at least one selected from a typical photo-radical initiator and a photo-cationic initiator well-known to those skilled in the art. The initiator may have an absorption wavelength of about 400 nm or less to allow formation of the high refractivity layer through photo-curing alone, without being limited thereto.

The photo-radical initiator promotes curing through generation of radicals by light radiation and may include at least one selected from among phosphorus, triazine, acetophenone, benzophenone, thioxanthone, benzoin, oxime, and phenyl ketone compounds. The photocationic initiator may include salts of cations and anions. Examples of the cations may include diaryliodonium, such as diphenyliodonium, 4-methoxydiphenyliodonium, bis(4-methylphenyl)iodonium, (4-methylphenyl)[(4-(2-methylpropyl)phenyl]iodonium, bis(4-tert-butylphenyl)iodonium, and bis(dodecylphenyl)iodonium; triarylsulfonium, such as triphenylsulfonium and diphenyl-4-thiophenoxyphenylsulfonium; bis[4-(diphenylsulfonio)phenyl]sulfide, bis[4-(di(4-(2-hydroxyethyl)phenyl)sulfonio)-phenyl]sulfide, ($\eta$5-2,4-cyclopentadiene-1il)[(1,2,3,4,5,6-$\eta$)-(1-methylethyl)benzene]iron(1$^+$), and the like. Examples of the anions may include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), and the like.

The inorganic particles can increase the index of refraction and hardness of the high refractivity layer. The inorganic particles may be subjected to no surface treatment or may be subjected to surface treatment (for example: (meth)acrylate group) to improve compatibility with other components while further improving hardness of the high refractivity layer. Surface treatment may be performed by about 5% to about 50% of the entire surface area of the inorganic particles. Within this range, the inorganic particles can increase hardness of the anti-reflective film together with the UV curable compound and the high refractivity resin. The inorganic particles are non-hollow inorganic particles and may include at least one selected from among silica, zirconia, titania, and alumina, preferably zirconia. The inorganic particles may have an average particle diameter (D50) of about 1 nm to about 50 nm, specifically about 5 nm to about 20 nm. Within this range, the inorganic particles do not deteriorate optical characteristics of the anti-reflective film while improving hardness thereof.

The composition for the high refractivity layer may further include typical additives well-known to those skilled in the art. For example, the composition for the high refractivity layer may further include an antistatic agent, a defoaming agent, an antioxidant, a UV absorbent, a photostabilizer, and a leveling agent, without being limited thereto. The additives may include typical additives well-known to those skilled in the art. The composition for the high refractivity layer may further include a solvent to improve coatability of the composition for the high refractivity layer. The solvent may include at least one selected from among propylene glycol monomethyl ether and methyl ethyl ketone.

The low refractivity layer 30A is formed on the high refractivity layer and has a lower index of refraction than the high refractivity layer to reduce reflectivity of the anti-reflective film. The low refractivity layer is directly formed on the high refractivity layer. A difference in index of refraction between the high refractivity layer and the low refractivity layer (the index of refraction of the high refractivity layer—the index of refraction of the low refractivity layer) may be about 0.25 or more, for example, about 0.25 to about 0.5. Within this range, the low refractivity layer can reduce reflectivity of the anti-reflective film while improving optical properties, such as haze and the like. The low refractivity layer may have an index of refraction of about 1.35 or less, for example, about 1.25 to about 1.32.

The low refractivity layer may include the monolayer arrangement of inorganic hollow particles 31 having an average particle diameter of about 70 nm to about 150 nm. With this structure, the low refractivity layer has no pores therein and thus can effectively prevent increase in reflectivity through permeation of external moisture into pores between the inorganic hollow particles, as compared with a low refractivity layer having a total thickness of about 70 nm to about 150 nm and including a bilayer arrangement of the inorganic hollow particles. Here, the "bilayer arrangement of the inorganic hollow particles" includes a structure wherein the inorganic hollow particles are arranged in two layers including first and second layers to be coaxial with each other or to be non-coaxial in each layer when one of the two layers is referred to as the first layer and the other layer is referred to as the second layer.

For example, the inorganic hollow particles may have an average particle diameter of about 70 nm, about 71 nm, about 72 nm, about 73 nm, about 74 nm, about 75 nm, about 76 nm, about 77 nm, about 78 nm, about 79 nm, about 80 nm, about 81 nm, about 82 nm, about 83 nm, about 84 nm, about 85 nm, about 86 nm, about 87 nm, about 88 nm, about 89 nm, about 90 nm, about 91 nm, about 92 nm, about 93 nm, about 94 nm, about 95 nm, about 96 nm, about 97 nm, about 98 nm, about 99 nm, about 100 nm, about 101 nm, about 102 nm, about 103 nm, about 104 nm, about 105 nm, about 106 nm, about 107 nm, about 108 nm, about 109 nm, about 110 nm, about 111 nm, about 112 nm, about 113 nm, about 114 nm, about 115 nm, about 116 nm, about 117 nm, about 118 nm, about 119 nm, about 120 nm, about 121 nm, about 122 nm, about 123 nm, about 124 nm, about 125 nm, about 126 nm, about 127 nm, about 128 nm, about 129 nm, about 130 nm, about 131 nm, about 132 nm, about 133 nm, about 134 nm, about 135 nm, about 136 nm, about 137 nm, about 138 nm, about 139 nm, about 140 nm, about 141 nm, about 142 nm, about 143 nm, about 144 nm, about 145 nm, about 146 nm, about 147 nm, about 148 nm, about 149 nm, or about 150 nm.

In one embodiment, the inorganic hollow particles may be continuously arranged without a gap therebetween. With this arrangement, the inorganic hollow particles can suppress not only penetration of external moisture through the outermost surface of the low refractivity layer, that is, through the outermost surface of the anti-reflective film but also increase in reflectivity due to moisture penetrated through the base layer and/or the high refractivity layer.

In one embodiment, the inorganic hollow particles may be continuously arranged without a gap therebetween and may form the outermost surface of the anti-reflective film. With this arrangement, the inorganic hollow particles can directly reflect external light, thereby further reducing reflectivity of the anti-reflective film.

In one embodiment, the monolayer arrangement of the inorganic hollow particles may directly adjoin the high refractivity layer.

The inorganic hollow particles are secured inside the low refractivity layer by a curing material 32, such as a binder and the like, described below.

The low refractivity layer may have a thickness in the range of about 100% to about 120% of the average particle diameter of the inorganic hollow particles. Within this range, the low refractivity layer can suppress reflectivity increase rate while reducing reflectivity under high humidity conditions or under high temperature and humidity conditions. In FIG. 1, the thickness of the low refractivity layer is substantially the same as the average particle diameter of the inorganic particles. In one embodiment, the low refractivity layer may have a thickness of about 70 nm to about 153 nm, specifically about 70 nm to about 150 nm. Within this range of thickness, the low refractivity layer can be used in the anti-reflective film. Herein, the "thickness of the low refractivity layer" means a distance from the lowermost surface of the low refractivity layer to the outermost surface thereof.

The inorganic hollow particles may include spherical or non-spherical particles. Preferably, the inorganic hollow particles include spherical particles to improve surface uniformity while securing uniform reflectivity on the outermost surface of the anti-reflective film.

The inorganic hollow particles may have a hollow structure to have a low index of refraction, thereby reducing the index of refraction of the low refractivity layer. The inorganic hollow particles may have an index of refraction of about 1.4 or less, for example, about 1.2 to about 1.38. The inorganic hollow particles may be hollow silica. The inorganic hollow particles may be subjected to no surface treatment or may be subjected to surface treatment with a UV curable functional group.

The inorganic hollow particles may be present in an amount of about 20 wt % to about 70 wt %, preferably about 40 wt % to about 60 wt %, in the total refractivity layers. Within this range, the inorganic hollow particles can reduce reflectivity of the anti-reflective film through reduction in index of refraction of the low refractivity layer.

The low refractivity layer may be formed of a composition for the low refractivity layer including inorganic hollow particles. In one embodiment, the composition for the low refractivity layer may include inorganic hollow particles; and a binder including a UV curable compound. The composition for the low refractivity layer may further include a fluorine-containing monomer or an oligomer thereof in order to reduce the index of refraction. The composition for the low refractivity layer may further include an initiator in order to cure the binder and/or the fluorine-containing monomer or the oligomer thereof.

The UV curable compound can form a matrix of the low refractivity layer and can secure the inorganic hollow particles to the low refractivity layer. The UV curable compound may include a fluorine-free monomer or an oligomer thereof. The fluorine-free monomer or the oligomer thereof may be a bi- or higher, for example, a bi- to deca-functional (meth)acrylate compound. Specifically, the fluorine-free monomer may include a polyfunctional (meth)acrylate, such as an ester of polyhydric alcohol and (meth)acrylic acid, as described above.

The initiator may be the same as or different from the initiator used in the composition for the high refractivity layer.

The additive serves to impart an anti-fouling function and slimness to the low refractivity layer and may be selected from any typical additives well-known to those skilled in the art. The additive may include at least one selected from among fluorine-containing additives and silicone-based additives. (It is difficult to ascertain the content of the additive.)

The composition for the low refractivity layer may include about 20 wt % to about 70 wt % of the inorganic hollow particles, about 10 wt % to about 50 wt % of the UV curable compound, about 5 wt % to about 25 wt % of the fluorine-containing monomer or the oligomer thereof, about 2 wt % to about 5 wt % of the initiator, and about 1 wt % to about 10 wt % of the additives. Within this range, the composition for the low refractivity layer can provide a pencil hardness of about 2H or higher and an anti-fingerprint effect. Preferably, the composition for the low refractivity layer includes about 40 wt % to about 60 wt % of the inorganic hollow particles, about 20 wt % to about 40 wt % of the UV curable compound, about 5 wt % to about 15 wt % of the fluorine-containing monomer or the oligomer thereof, about 2 wt % to about 4 wt % of the initiator, and about 2 wt % to about 7 wt % of the additives.

The composition for the low refractivity layer may further include typical additives well-known to those skilled in the art. For example, the composition for the low refractivity layer may further include a defoaming agent, an antioxidant, a UV absorbent, a photostabilizer, and a leveling agent, without being limited thereto.

The composition for the low refractivity layer may further include a solvent to improve coatability of the composition for the low refractivity layer. The solvent may include at least one selected from among methyl ethyl ketone, methyl isobutyl ketone, and ethylene glycol dimethyl ether.

Next, an anti-reflective film according to another embodiment of the present invention will be described with reference to FIG. 2.

Referring to FIG. 2, an anti-reflective film 200 according to another embodiment includes a low refractivity layer 30B and is substantially the same as the anti-reflective film according to the above embodiment except that a curing material 32, such as a binder and the like, is further formed on the monolayer arrangement of the inorganic hollow particles 31.

Next, an anti-reflective film according to a further embodiment of the present invention will be described with reference to FIG. 3.

Referring to FIG. 3, an anti-reflective film 300 according to a further embodiment is substantially the same as the anti-reflective film according to the above embodiment except that a hard coating layer 40 is further formed between the base layer 10 and the high refractivity layer 20.

The hard coating layer 40 may have an index of refraction of about 1.50 to less than about 1.60, for example, about 1.50 to about 1.599. Within this range, the hard coating layer 40 can further reduce reflectivity of the anti-reflective film.

The hard coating layer 40 may be formed of a polyurethane resin, a urethane (meth)acrylate resin, an epoxy resin, or a silicone resin, without being limited thereto.

The hard coating layer 40 may have a thickness of about 5 μm to about 20 μm, for example, about 7 μm to about 15 μm. Within this range, the hard coating layer can be used in the anti-reflective film.

Next, a polarizing plate according to one embodiment of the present invention will be described.

The polarizing plate according the present invention may include the anti-reflection film according to the embodiments of the present invention.

In one embodiment, the polarizing plate may include a polarizer, the anti-reflective film according to the present invention formed on a light exit surface of the polarizer, and a polarizer protective layer formed on a light incident surface of the polarizer. With the anti-reflective film according to the present invention, the polarizing plate may have a reflectivity of about 0.5% or less, for example, about 0.2% to about 0.5%, and may have a reflectivity variation rate of about 100% or less, for example, about 75% or less, specifically about 70% or less, as calculated by Equation 2:

Reflectivity variation rate=$|R_3-R_2|/R_2 \times 100$,  <Equation 2> wherein Equation 2, $R_2$ indicates initial reflectivity (unit: %) of the polarizing plate and $R_3$ indicates reflectivity (unit: %) of the polarizing plate left at 60° C. and 95% RH for 72 hours.

Within this range, the anti-reflective film can suppress increase in reflectivity to improve reliability even under high temperature and humidity conditions or under high humidity conditions.

In Equation 2, $R_3$ may be about 0.7% or less, for example, about 0.2% to about 0.7%, specifically about 0.2% to about 0.6%. Within this range, the polarizing plate can secure improvement in image quality.

The polarizer serves to polarize light received from a liquid crystal panel.

The polarizer may include a polyvinyl alcohol-based polarizer prepared by uniaxially stretching a polyvinyl alcohol film, or a polyene-based polarizer prepared by dehydrating a polyvinyl alcohol film. The polarizer may have a thickness of about 5 µm to about 40 µm. Within this range, the polarizer can be used in an optical display device.

The polarizer protective layer may include at least one of an optically transparent protective film or an optically transparent protective coating layer. As the polarizer protective layer, the protective film may include a protective film formed of an optically transparent resin. The protective film may be formed by melting and extruding the resin. A stretching process may be further added, as needed. The resin may include at least one selected from among cellulose ester resins including triacetylcellulose (TAC), cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, poly(meth)acrylate resins including poly(methyl methacrylate), polyvinyl alcohol resins, polyvinyl chloride resins, polyvinylidene chloride resins, and acrylic resins.

As the protective layer, the protective coating layer can improve adhesion to the polarizer, transparency, mechanical strength, heat stability, moisture blocking, and durability. In one embodiment, the protective coating layer may be formed of an actinic radiation-curable resin composition including an actinic radiation-curable compound and a polymerization initiator. The actinic radiation-curable compound may include at least one selected from the group of a cationic polymerizable curable compound, a radical polymerizable curable compound, a urethane resin, and a silicone resin. The cationic polymerizable curable compound may be an epoxy compound having at least one epoxy group or an oxetane compound having at least one oxetane ring. The radical polymerizable curable compound may be a (meth)acrylic compound having at least one (meth)acryloyloxy group.

The protective layer may have a thickness of about 5 µm to about 200 µm, specifically about 30 µm to about 120 µm. The protective film type protective layer may have a thickness of about 30 µm to about 100 µm and the protective coating layer type protective layer may have a thickness of about 5 µm to about 50 µm. Within this range, the protective layer can be used in a light emitting display device.

A liquid crystal display device may include the polarizing plate according to the present invention as a viewer-side polarizing plate with respect to a liquid crystal panel. Here, the "viewer-side polarizing plate" refers to a polarizing plate disposed at a screen side with respect to the liquid crystal panel, that is, at a side opposite to a light source side.

In one embodiment, the liquid crystal display device may include a backlight unit, a first polarizing plate, a liquid crystal panel, and a second polarizing plate sequentially stacked one above another in the stated order, wherein the polarizing plate includes the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

[Mode for Invention]

Next, the present invention will be described in more detail with reference to some examples. It should be understood that these examples are provided for illustration only and are not to be in any way construed as limiting the invention.

Example 1

A 23 µm thick polarizer was prepared by stretching a polyvinyl alcohol film to 3 times an initial length thereof at 60° C., dyeing the stretched film with iodine, and stretching the dyed film to 6 times in a boric acid solution at 40° C.

An anti-reflective film (40CXR20, Toppan Co., Ltd.) was bonded to one surface of the polarizer using a UV bonding agent. A ZF12 film (ZEON Co., Ltd.) was bonded to the other surface of the polarizer using a UV bonding agent, thereby preparing a polarizing plate. Detailed specification of the anti-reflective film 40CXR20 is shown in Table 1.

Example 2

A polarizing plate was prepared in the same manner as in Table 1 except that an anti-reflective film having specifications as listed in Table 1 was used instead of the anti-reflective film (40CXR20, Toppan Co., Ltd.).

Comparative Example 1

A polarizing plate was prepared in the same manner as in Table 1 except that DSG-17(Z)PET (DNP Co., LTd.) was used as an anti-reflective film instead of the anti-reflective film (40CXR20, Toppan Co., Ltd.).

Comparative Example 2

A polarizing plate was prepared in the same manner as in Table 1 except that DSG-17(Z)TG60 (DNP Co., LTd.) was used as an anti-reflective film instead of the anti-reflective film (40CXR20, Toppan Co., Ltd.).

Comparative Example 3

A polarizing plate was prepared in the same manner as in Table 1 except that an anti-reflective film having specifications as listed in Table 3 was used instead of the anti-reflective film (40CXR20, Toppan Co., Ltd.).

In Items (1) and (2) of Table 1, initial reflectivity of anti-reflective films and reflectivity of the anti-reflective films after high temperature/humidity testing were evaluated by the same method using the anti-reflective film instead of a polarizing plate.

TABLE 1

|  | Base layer | Average particle diameter of hollow silica | Arrangement of hollow silica | Thickness* (nm) | Reflectivity (%) | Reflectivity after high temperature/ humidity testing (%) |
|---|---|---|---|---|---|---|
| Example 1 | PET | 70 | Monolayer | 70 | 0.3 | 0.5 |
| Example 2 | PET | 150 | Monolayer | 150 | 0.4 | 0.7 |
| Comparative Example 1 | PET | 50 | Bilayer I | 100 | 0.3 | 1.2 |
| Comparative Example 2 | TAC | 60 | Bilayer I | 120 | 0.3 | 1.2 |
| Comparative Example 3 | TAC | 50 | Bilayer II | 70 | 0.3 | 0.9 |

*Thickness: total thickness of hollow silica layer in low refractivity layer

\* When one of two layers is referred to as a first layer and the other layer is referred to as a second layer, the case wherein the inorganic hollow particles in each of the first and second layers are coaxially arranged is indicated by Bilayer I and the case wherein the inorganic hollow particles in each of the first and second layers are non-coaxially arranged is indicated by Bilayer II.

The polarizing plates prepared in Examples and Comparative Examples were evaluated as to the following properties shown in Table 2.

(1) Reflectivity (unit: %): A specimen was prepared by laminating a black acryl plate (PH10) on the ZF 12 film of each of the polarizing plates of Examples and Comparative Examples using an acrylic adhesive. Reflectivity of the specimen was measured in an SCI reflection mode (light source: C-light source, light source aperture: Φ4 mm, measurement viewing angle: 2°) in a predetermined wavelength range using a spectrophotometer (Konica Minolta, CM-2600D).

(2) Reflectivity after high temperature/humidity testing (unit: %): A specimen prepared in the same manner as in (1) was left under conditions of 60° C. and 95% RH for 72 hours, followed by measurement of reflectivity by the same method as in (1).

(3) Degree of polarization and Transmittance (unit: %): A degree of polarization and transmittance of each of the polarizing plates prepared in Examples and Comparative Examples were measured using a spectrophotometer V-7100.

TABLE 2

|  | Reflectivity | Reflectivity after high temperature/ humidity testing | Reflectivity variation rate of Equation 2 | Degree of polarization | Transmittance |
|---|---|---|---|---|---|
| Example 1 | 0.3 | 0.5 | 67 | 99.999 | 44 |
| Example 2 | 0.4 | 0.7 | 75 | 99.995 | 44 |
| Comparative Example 1 | 0.3 | 1.2 | 300 | 99.995 | 43.5 |
| Comparative Example 2 | 0.3 | 1.2 | 300 | 99.995 | 43.5 |
| Comparative Example 3 | 0.3 | 0.9 | 200 | 99.995 | 43.8 |

As shown in Table 2, the polarizing plates of Examples did not exhibit or could minimize increase in reflectivity and did not exhibit variation in degree of polarization and transmittance as compared with typical anti-reflective films including a bilayer arrangement of hollow particles, even after being left under high temperature and high humidity conditions or under high humidity conditions for a long period of time.

Conversely, the polarizing plates of Comparative Examples 1 to 3, in which the total thickness of the hollow silica layers in the low refractivity layer was similar to the thickness of the hollow silica layer of Examples and the hollow silica layers were stacked in two layers, exhibited transmittance variation and a relatively high reflectivity variation rate after being left under high temperature and high humidity conditions or under high humidity conditions for a long period of time.

It should be understood that various modifications, changes, alterations, and equivalent embodiments can be made by those skilled in the art without departing from the spirit and scope of the present invention.

The invention claimed is:

1. An anti-reflective film comprising: a base layer, a high refractivity layer, and a low refractivity layer sequentially stacked,
    wherein the low refractivity layer comprises a monolayer arrangement of inorganic hollow particles having an average particle diameter of about 70 nm to about 150 nm and arranged in a single layer within the anti-reflective film, the single layer forming an outermost layer of hollow particles of the anti-reflective film, a difference in index of refraction between the high refractivity layer and the low refractivity layer is about 0.25 or greater, the low refractivity layer has an index of refraction of about 1.35 or less, and the high refractivity layer has an index of refraction of about 1.53 to about 1.70; and
    wherein the inorganic hollow particles form an outermost surface of the anti-reflective film.

2. The anti-reflective film according to claim 1, wherein the single layer has a thickness of about X nm to about X nm+3 nm when the average particle diameter of the inorganic hollow particles is about X nm.

3. The anti-reflective film according to claim 1, wherein the inorganic hollow particles comprise hollow silica.

4. The anti-reflective film according to claim 1, wherein the low refractivity layer has a thickness in the range of about 100% to about 120% of the average particle diameter of the inorganic hollow particles.

5. The anti-reflective film according to claim 1, wherein the inorganic hollow particles are present in an amount of about 20 wt % to about 70 wt % in the low refractivity layer.

6. The anti-reflective film according to claim 1, wherein the inorganic hollow particles are continuously arranged without a gap therebetween.

7. The anti-reflective film according to claim 1, wherein the monolayer arrangement of the inorganic hollow particles directly adjoins the high refractivity layer.

8. The anti-reflective film according to claim 1, further comprising:
a hard coating layer between the base layer and the high refractivity layer.

9. A polarizing plate comprising: a polarizer; and the anti-reflective film according to claim 1 formed on a light exit surface of the polarizer.

10. The anti-reflective film according to claim 1,
wherein the anti-reflective film has a reflectivity variation rate of about 100% or less, as calculated by Equation 1:

Reflectivity variation rate=$|R_1-R_0|/R_0 \times 100$,   <Equation 1> where, in Equation 1, $R_0$ indicates initial reflectivity (unit: %) of the anti-reflective film and $R_1$ indicates reflectivity (unit: %) of the anti-reflective film left at 60° C. and 95% relative humidity (RH) for 72 hours.

11. The anti-reflective film according to claim 10, wherein $R_1$ is about 0.7% or less in Equation 1.

12. The polarizing plate according to claim 9, wherein the polarizing plate has a reflectivity variation rate of about 100% or less, as calculated by Equation 2:

Reflectivity variation rate=$|R_3-R_2|/R_2 \times 100$,   <Equation 2> where, in Equation 2, $R_2$ indicates initial reflectivity (unit: %) of the polarizing plate and $R_3$ indicates reflectivity (unit: %) of the polarizing plate left at 60° C. and 95% RH for 72 hours.

13. The polarizing plate according to claim 9, further comprising:
a polarizer protective layer formed on a light incident surface of the polarizer.

14. An optical display device comprising the polarizing plate according to claim 9.

\* \* \* \* \*